United States Patent Office 3,695,874
Patented Oct. 3, 1972

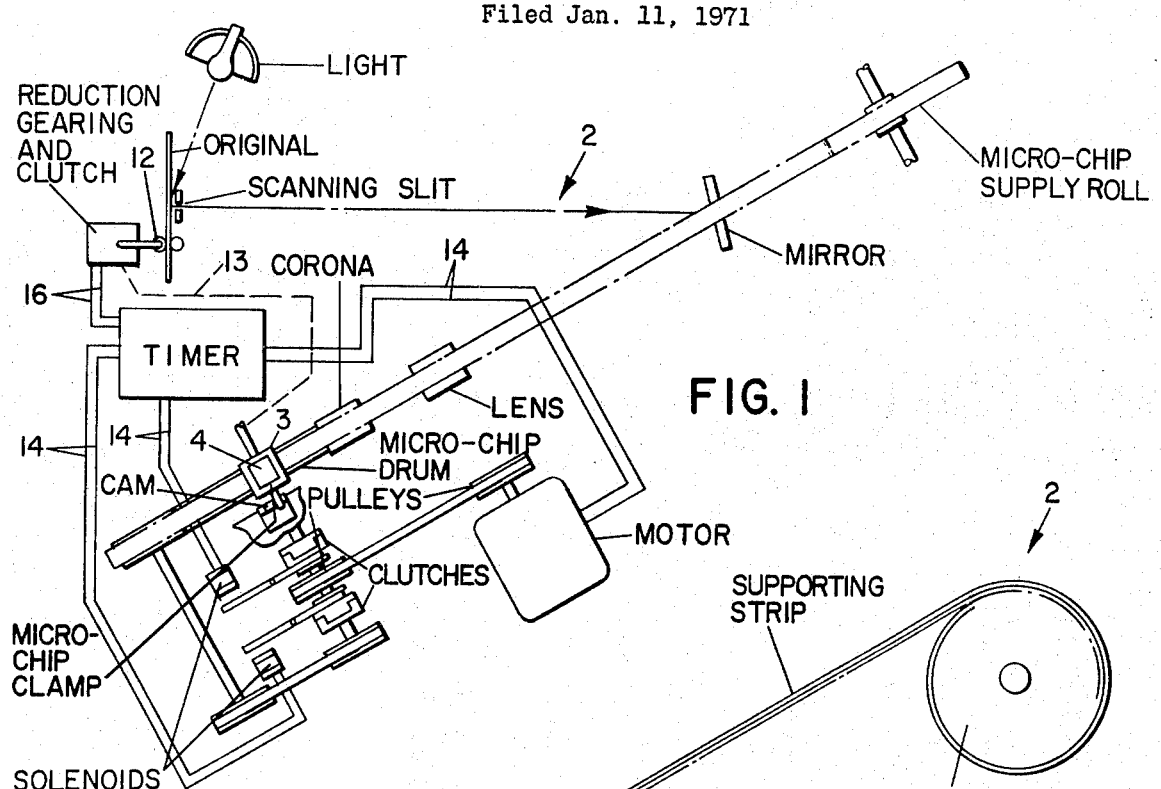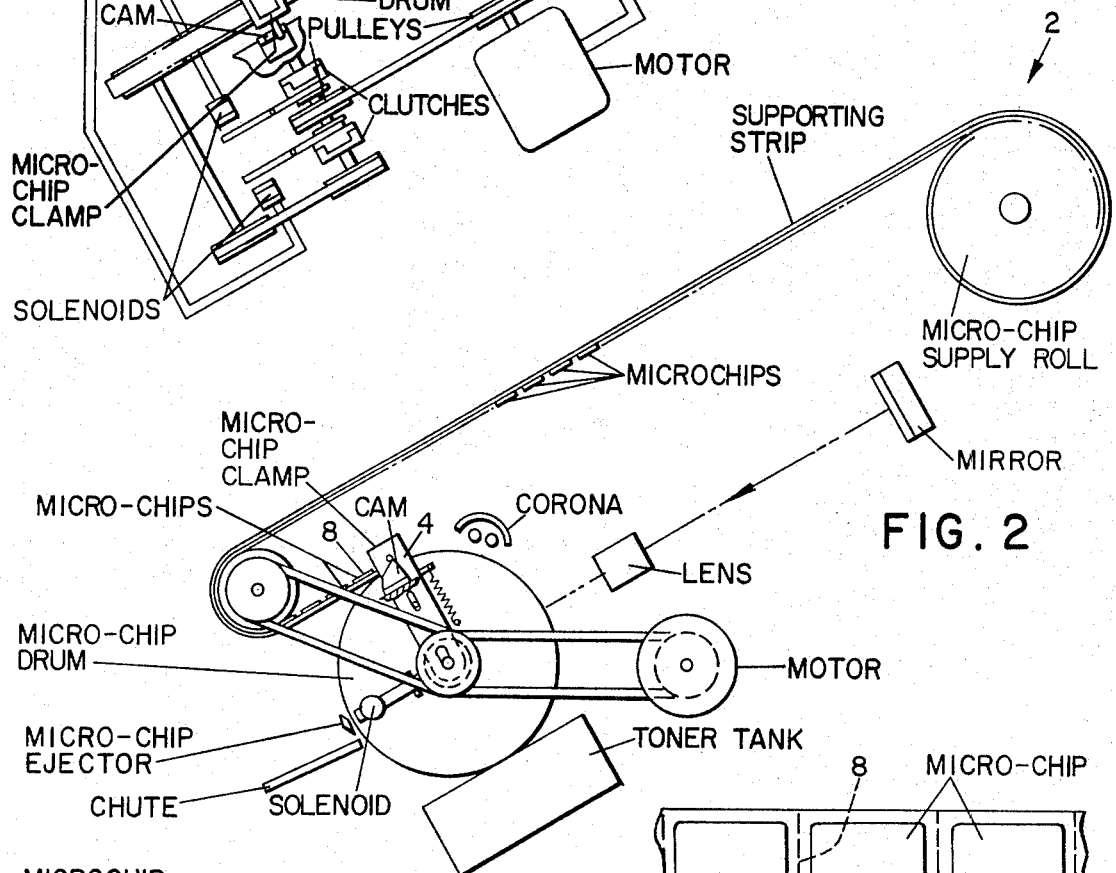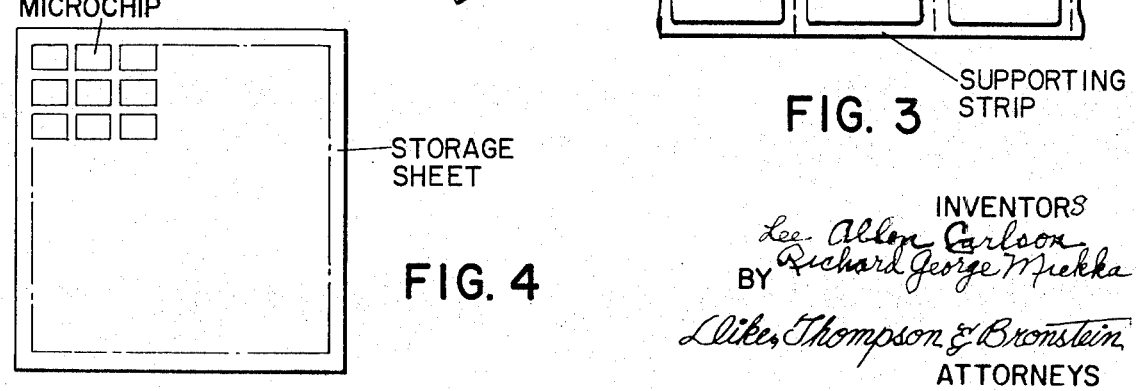

3,695,874
MICROELECTROPHOTOGRAPHIC SHEET
Lee Allen Carlson, Southboro, and Richard George Miekka, Sudbury, Mass., assignors to Dennison Manufacturing Company, Framingham, Mass.
Filed Jan. 11, 1971, Ser. No. 105,370
Int. Cl. G03g 7/00
U.S. Cl. 96—1.8                                         12 Claims

ABSTRACT OF THE DISCLOSURE

Microelectrophotographic sheet, comprising an electrophotographic layer of zinc oxide particles in an insulator binder on a conductive base sheet, for producing microelectrophotographs for storage and retrieval of information and in which the surface of the base sheet to which the electrophotographic layer is applied has a maximum Sheffield Smoothness of 40 and no more than 5% by volume of the photoconductive zinc oxide has an agglomerate particle size greater than 10 microns.

STATEMENT OF INVENTION

The present invention relates to method and apparatus for producing microimages of high resolution and contrast for storage and retrieval of information by the use of electrophotography and to reduced size microelectrophotograph reproduction sheets, hereinafter sometimes referred to as microchips, for use in such method and apparatus.

Present day commercial microimaging involves microfilming on silver halide coated transparent or translucent microfilm by exposing such microfilm to the original through a camera opening and a reducing lens to thereby achieve reduction of 20 to 1 and higher with resolutions or over 100 lines per millimeter. Conventional microfilm is usually in the form of a transparent or translucent strip 16 millimeter (0.63 inch) or 35 millimeters (1.38 inches) wide or microfiche which consists of multiple microimages on a small rectangular piece of film.

Microfilming in this way, in addition to being costly, has other disadvantages. Some of these disadvantages are:

(1) In most instances the complete roll of film must be exposed and developed before access to any one image is possible.

(2) To obtain access after development to any one desired frame one must scan the complete film either manually, which is time consuming, or by automatic retrieval equipment, which is expensive.

(3) Most microfilm is in negative image form and has such high reduction ratios that it is impractical to read the images directly and requires the use of expensive transmitted light projection equipment for reading.

(4) In order to edit or update or change any one frame or change the order of the frames in a completely exposed film or fiche, cutting, splicing and other time consuming and expensive operations are required.

Furthermore, where it is necessary to send the film out for development, either to an outside processing company or to a film processing department within the company, which is true in most instances, control over the information on the roll of microfilm is lost which has obvious disadvantages. Thus, to retrieve the information on one document or to obtain a readable print of one document from the hundreds or thousands of microimages on the single roll of microfilm is, indeed, time consuming, inconvenient and expensive.

The present invention provides a method and apparatus for microimaging without the use of silver halide photographic microfilm and without the aforesaid disadvantages to instantly obtain a clear, individual, microsize positive of each original with reductions in size as high as 20 to 1 and with accetpable resolution and clarity of both the microimage and the blown-up enlargement thereof.

This is achieved in accordance with the present invention by exposing to each original through an exposure opening and reducing lens, a reduced microsize electrophotographic sheet, i.e., a microeelctrophotographic sheet or microchip, which has been charged and which, after exposure, is immediately and individually toner developed to obtain an individual positive microelectrophotograph for each original document.

In a preferred embodiment for filing and storage, a plurality, e.g. 50–100 or more, of these individual microelectrophotographs or developed microchips are removably mounted on a storage sheet, e.g. by pressure sensitive adhesive, to produce on a single mounting sheet in positive form which can be read directly through a magnifying lens, the information contained in between 50 and 100 or more documents. If desired, these storage sheets can be placed in loose leaf or bound books, filing cabinets and the like.

The size of the microchips depends, of course, on the reduction desired and on the size of the original. For example, if the originals are 8½ x 11 and a reduction of about 10 to 1 is desired, the chip may be about 1 x 1 inch or less. If only a reduction of 3 to 1 is desired, the microchip must, of course, be greater in size.

Preferably, a plurality of the small microelectrophotographic sheets or microchips are removably and individually mounted in a row on an endless backing or supporting strip which is fed from a supply roll to a microchip drum which picks up the individual microchips at a microchip pick-up station and moves them one at a time past a charging station at which the electrophotographic layer is electrically charged, an exposure station at which the charged layer is exposed to the original through the exposure opening and reducing lens, a toner developing station at which the microelectrophotographic image is toner developed, and a microchip removal station for removing the developed microchips from the drum. The originals are fed past the exposure opening in synchronization with the feeding of the strip of microchips and the rotation of the drum.

In a preferred embodiment the portion of the backing strip supporting the microchip to be exposed is severed from the rest of the strip either at the pick-up station or at the removal station so that individual, positively developed microchips are obtained removably secured to the severed portion of the backing strip. They need only be peeled off from such portion and mounted on the storage sheet.

Each microchip comprises an electrically conductive base sheet having applied thereto an electrophotographic layer comprising a photoconductive material, preferably photoconductive particles such as photoconductive zinc oxide particles, embedded in an insulator binder.

It has been discovered that optimum resolution is achieved (1) by use of a conductive base sheet in which the surface to which the electrophotographic layer is applied has a maximum Sheffield Smoothness of 40 and (2) by use of photoconductive particles, preferably photoconductive zinc oxide particles, of which no more than about 5% by volume have an agglomerate particle size greater than 10 microns.

It is preferred to removably secure the microchips to the backing strip by means of a pressure sensitive adhesive layer applied to the surface of the base sheet opposite from the electrophotographic layer. In such case, either (1) the conductive base sheet is supplied with an electrically unipotential surface, such as a conductive continuous metal layer, e.g. aluminum, silver, gold, etc. or a conductive carbon layer, or (2) the pressure sensitive adhesive layer is rendered conductive by adding conductive material thereto, e.g. (a) conductive metal particles, such as silver or gold, or (b) a conductive resin, such as polyvinyl quarternary ammonium salts, or (c) a highly ionizable salt of a strong mineral acid, such as potassium chloride. Preferably, a unipotential surface is used with a conventional pressure sensitive adhesive. Where a continuous metal layer, e.g. aluminum or silver foil, or a carbon layer is used to provide the unipotential surface, it is preferably laminated with a thin paper or plastic sheet to give support to the metal foil or carbon layer. Where a conductive pressure sensitive adhesive layer is used, it is preferred to render the backing strip for the microchip electrically conductive also by impregnation with one or more of the aforesaid electrically conductive materials.

Preferably, the pressure sensitive adhesive is permanently adhered to the back of the microchip so that it is peeled off the backing strip with the microchip for sticking the microchip to the storage sheet surface. In such case, the surface of the backing strip on which the microchips are mounted before and/or during imaging comprises a material having poor adhesion to the pressure sensitive adhesive, e.g. silicone, so that the microchips can be easily stripped off from the same. In effect, the backing strip becomes a protective release sheet to protect the pressure sensitive adhesive layer until the developed microchip is ready to be mounted on the storage sheet. However, the adhesive may be permanently secured to the backing strip so that it remains entirely with the backing strip when the microchip is peeled off from the same. In such case, other means are provided for attaching the microchips to the storage sheet or medium.

The term electrically unipotential layer or surface means that the surface is so highly conductive to electricity that the electrical potential at every unit area is substantially the same at any given instant under electrophotographic exposure conditions, i.e., the surface is so highly conductive that there is no substantial voltage difference, i.e., difference in potential, between different areas of the surface at any given time, as distinguished from the more limited conductance achieved with conventional conductive resin coatings used in electrophotography, such as coatings containing, or consisting primarily of, polyvinyl quaternary ammonium salts, which are conductive resins, and coatings of non-conductive resins to which a highly ionizable inorganic salt has been added to render them ionically conductive. These conventional ionically conductive coatings are ordinarily applied to electrophotographic paper to render the paper conductive. Also, the paper substrate itself is sometimes conventionally impregnated with the inorganic salt or the conductive resin to render it ionically conductive. Such conventional conductive resin coatings are quite thin, which limits their conductance. However, in the case of coatings employing conductive resins to render them conductive, by increasing the thickness and weight thereof substantially beyond the conventional amount, i.e., by increasing coating thickness to greater than 5 pounds per 3,000 sq. ft. ream, it is possible to achieve a conductance approaching unipotential conductance as above defined.

A continuous surface of highly conductive metal, such as silver, aluminum, gold, copper, etc. is preferred as a unipotential surface because of its greater conductivity. The metal layer forming the metal surface should preferably be quite thin and highly flexible and may be in the form of a thin (e.g. a fraction of a mil thick, i.e. 0.1–0.6 or 0.8 mil) flexible metal foil, as such, or laminated to a thin flexible paper or plastic, e.g. polyvinyl, sheet to provide supporting strength. A vacuum metallized paper or plastic sheet can be used also.

In any event, where the microchips are supported on any kind of a supporting or backing strip during charging, exposure and developing, either the conductive base sheet must contain a unipotential surface, or the supporting strip plus the adhesive used to adhere the microchips thereto, must be sufficiently electrically conductive through the thickness thereof to permit a sufficient rate of leakage of charge through such thickness from the electrophotographic layer during exposure to adequately discharge the exposed areas of such layer at a reasonable exposure time, this being achieved by impregnating the adhesive layer, and preferably also the strip itself, with the aforesaid electrically conductive material.

However, the microchips themselves may be in the form of a continuous strip without any supporting strip, in which case they can be separated by transversely extending lines of perforations in the strip for severing each individual microchip from the strip during processing, or the individual microchips can be severed from the strip by a knife during processing without the use of perforation lines.

A supporting strip with individual microchips supported thereon is preferred, with the supporting strip being slightly wider than the microchips for feeding the strip to the drum and for removably securing the individual microchips to the drum during charging, exposure and development. Furthermore, the use of a supporting strip permits the use of an adhesive layer on the underside of the microchips for subsequent adhesion to the storage sheet, in which case the supporting strip also acts as a protective sheet to protect the adhesive layer, as aforesaid.

Further features and advantages of the invention will be apparent from the following description and the accompanying drawings in which:

BRIEF DESCRIPTION OF DRAWINGS

FIG. 1 is a schematic view in plan of an apparatus embodying the invention and for carrying out the method of the invention.

FIG. 2 is a schematic view in elevation of the apparatus of FIG. 1.

FIG. 3 is a view in plan of the strip of individual microchips shown in FIGS. 1 and 2.

FIG. 4 is a reduced view in plan of the storage sheet with a plurality of the microchips of FIG. 3 developed in the apparatus of FIGS. 1 and 2 and removably secured to such storage sheet.

DETAILED DESCRIPTION

With reference to the drawings, 2 represents an embodiment of the apparatus of the present invention in which a row of microchips, which are so labeled in the drawings, which are of a composition and construction to be described more fully hereinafter and which are removably adhered to a continuous supporting strip, so labeled in the drawings and to be more specifically described hereinafter, are fed from a microchip supply roll, so labeled in the drawings, by means of a microchip feed roll, so labeled in the drawings, onto the surface of a microchip drum, so labeled in the drawings, and under the clamping face 3 of a radially slidable (with respect to the drum) chip clamp, so labeled in the drawings. When a microchip is fed onto the drum surface between such surface and the clamping face of the chip clamp, the drum is stationary and the clamping face is held away from the drum surface by the stationary cam, so labeled in the drawings, against the force of spring 6 normally urging the clamping face into engagement with the drum surface, to permit movement of the microchip and its supporting strip to between the clamping face and the drum surface, as aforesaid, with the microchip facing outwardly and upwardly and the underlying supporting strip facing the drum surface.

The clamping face over the microchip and drum periphery has a central window 4 to expose and form a frame for the microchip (the electrophotographic layer thereof faces outwardly and is exposed) for subsequent individual charging, exposure and development thereof. Upon movement by the microchip feed roll of each microchip to this position, which may be considered a microchip pick-up position or station of the drum, the microchip drum is connected with the driving motor so labeled in the drawings, through a clutch, so labeled in the drawings, and at the same time the drive for the microchip drum is connected with the drivnig motor through such clutch to rotate the drum clockwise. The chip clamp rotates with the drum. Upon initial rotational movement of the drum and chip clamp, the cam pin 4 on the clamp moves away from the cam and the radially slidable clamp is pulled radially and downwardly by the spring 6 into engagement with the supporting strip margins around the microchip to securely clamp the microchip to the drum surface for rotation therewith. Consequently, further rotational movement of the drum and microchip clamped thereto clockwise, while the rest of the microchip strip is held by the now stationary and braked microchip feed roll, causes the supporting strip to break at the weakend perforation line 8 adjacent the clamped microchip toward the feed roll (the supporting strip has transverse perforation lines 8 between adjacent microchips for this purpose).

The clamped microchip with the severed portion of the supporting strip to which it is adhered moves with the drum surface past a conventional corona charging device or station, labeled corona in the drawings, to charge the electrophotographic layer of such microchip, and thence past a point opposite the reducing lens, which is so labeled in the drawings, which is a conventional reducing lens used in microfilming, and which may be referred to as an exposure station. At the same time that the microchip is moved past the exposure station opposite the lens, the original to be microelectrophotographed is moved in synchronization with the microchip past an exposure or scanning slit or opening, so labeled in the drawings, which is supplied with a source of light, so labeled in the drawings, to illuminate the original and of a type conventionally used in electrophotography, whereby the charged electrophotographic layer of the microchip is exposed to the original through such slit, a mirror, so labeled in the drawings, and the reducing lens, to thereby form a latent electrophotographic image on the microchip.

The feeding mechanism 12 of the original to be microelectrophotographed, is driven from the chip drum, as shown in the drawings at 13, through a reduction gearing and clutch, so labeled in the drawings, to synchronize movement of the original past the scanning slit with movement of the microchip past the lens and exposure station at a predetermined speed ratio, depending on the reduction in size of the original desired.

The timer, so labeled in the drawings, controls, through circuits 14 and a pair of solenoids, so labeled in the drawings, the synchronized engagement and disengagement of the microchip feed roll and drum drives and also controls, through circuit 16 and solenoids, not shown, movement of the original past the scanning slit in synchronization with movement of the microchip past the exposure station.

Continued clockwise rotation of the microchip drum moves the clamped exposed microchip through a bath of charged toner particles in a toner tank, so labeled in the drawings (this may be referred to as the development station), to toner develop the latent image.

Further rotation of the drum carries the developed clamped microimage to the microchip ejection station or ejector, so labeled in the drawings, in the form of a knife, to remove the microchip from the drum surface, whereupon it falls into a collecting container outside the machine through a chute, so labeled in the drawings. Another cam, similar to that at the pick-up station, is provided at the ejector station to move the clamp radially outwardly and thereby release the microchip for ejection by the ejector.

The surface of the microchip feed roll is provided with slight depressions around its periphery, having about the same depth as the thickness of the microchips and having about the same dimensions as those of the microchips, for receiving the microchips to prevent longitudinal slippage between the strip and feed roll. However, any conventional strip feeding mechanism can be used to feed the strip of microchips to the drum.

The drum, corona, and toner tank are all encased in a lightproof chamber so that the microchip is at all times in the dark while on the drum except for exposure to the original at the exposure station.

All the parts may be mounted in a compact and portable casing. The power of the corona and the light may be provided by battery or by connection to an electrical receptacle.

If desired, the microchip can be releasably secured to the drum surface for charging, exposure and development in the dark by means of a controlled vacuum or by any other means which does not interfere with such charging, exposure and development rather than by the chip clamp shown.

Although in the drawings, there is only one microchip on the drum at a time, if desired the drives for the feed roll, the drum and the feed for the originals can be adjusted and the clamping means designed so that there are a plurality of individual microchips on the drum at the same time with one microchip being charged while another is being exposed while yet another is being developed while yet another is being ejected.

In the embodiment shown in the drawings, the microchips are releasably secured to the supporting strip by a pressure sensitive adhesive layer permanently adhered to the back of each microchip and the supporting strip is made of paper coated with a silicone coating having a low adhesion to the pressure sensitive adhesive layer to permit the microchips to be peeled off from the supporting strip, as will be described in greater detail hereinafter.

The ejected microchips are peeled off from the severed portions of the supporting strip to which they are adhered and are subsequently adhered by such pressure sensitive adhesive layer to the storage sheet, so labeled in the drawings, in the same order as the originals.

The developed images on the individual microchips are positive, so that no further processing is required, and can be easily selected and read by a magnifying glass without the necessity of a special projector. Each is individually removable from the storage sheet for further reproduction or enlargement or for whatever other purpose which might be desired, editing, updating, etc. Furthermore, the microchips can be rearranged on the storage sheet at will for comparison purposes. The identity of the documents may be printed or written on the storage sheet.

Example 1

An electrophotographic coating composition is made up by adding 49.4 grams of a 45% by weight toluene solution of a modified acrylic polymer, which solution is sold by DeSoto Chemical Company, Chicago, Illinois, under the trade name DeSoto E–O 41 resin, to 143.0 grams of toluene and admixing therewith 180 grams of photoconductive zinc oxide, sold by the New Jersey Zinc Co. under the name Kadox 72 (ultimate particle size of 0.1 micron), and 3.01 ml. of a 1% methanol solution of sensitizing dye (0.29 gram bromophenol blue, 0.59 gram uranine (USP) plus 0.135 gram methylene blue dissolved in 99 grams methanol). This composition has a solids content of 54% by weight and a ratio of acrylic binder to zinc oxide of 8 to 1.

The aforesaid coating composition is milled in a Waring Blendor from 2.5 to 3 minutes to reduce the agglomerate particle size of the zinc oxide to from 1 to 5 microns and is then uniformly coated onto the aluminum surface of an aluminum foil laminated paper web, sold by Reynolds Metals Company under the name No. 88 Dull Vinyl Aluminum Foil Laminated Paper (aluminum foil thickness of 0.2–0.6 mils and paper thickness of 1 to 4 mils), in an amount equal to twenty pounds per 24 x 36 500 sheet ream followed by drying to provide an electrophotographic coating layer having an average thickness of 0.6–1.0 mil. The aluminum surface of the aluminum foil laminated paper to which the electrophotographic coating composition is applied, has a very thin coating (less than one lb. of resin per 3,000 foot square ream, sometimes referred to as a washcoat) of a dull polyvinyl acetate lacquer thereover, which gives good adhesion between the electrophotographic coating and the aluminum surface. The vinyl acetate lacquer-covered aluminum surface has a Sheffield Smoothness of 15–30. The paper to which the aluminum foil is laminated is a high grade paper.

A pressure sensitive adhesive solution is prepared as follows:

| | G. |
|---|---|
| Styrene-butadiene rubber | 100 |
| Hydrogenated wood rosin | 50 |
| Toluene (solvent) | 300 |
| Antioxidant (2.4 - di(tert.-amyl)hydroquinone sold under the name Santovar A by Monsanto Chemical Company) | 3 | and is uniformly coated on the silicone surface of a conventional silicone coated release paper web, i.e. a 50 lb. Deerfield Release Paper sold by Deerfield Paper Company, in the amount of 9–10 lbs. of adhesive resin solution per 24 x 36 500 sheet ream and dried to provide a highly pressure sensitive adhesive layer about one mil thick.

The paper surface of the electrophotographic layer-aluminum foil laminated paper laminate is then pressed against the exposed pressure sensitive adhesive surface of the pressure sensitive adhesive-release sheet laminate to adhere the two laminates together by virtue of the adhesiveness of the pressure sensitive adhesive and to thereby form the composite electrophotographic pressure sensitive sheet or web.

The composite electrophotographic pressure sensitive web or sheet, the upper surface of which comprises the electrophotographic layer and the lower surface of which comprises the release sheet, is then slit into one inch strips, which are cut by a die into individual microchips with the cut lines extending through the electrophotographic coating, the aluminum foil laminated paper and the pressure sensitive adhesive layer but not through the release sheet, the die being designed to only perforate such release sheet along transverse lines 8 between adjacent microchips, so that the release sheet strip comprises a perforated but continuous supporting strip to which the individual electrophotographic pressure sensitive microchips are releasably adhered, as shown in FIG. 3, but from which they can be individually removed and stuck to the storage sheet. After the die has cut the individual microchips, the portion of the electrophotographic layer-aluminum foil laminated paper laminate between the microchips is stripped off the release strip as a skeleton to leave the microchips on the release strip but to expose the silicone surface of the release strip between the individual microchips and along the margins of the microchips, as shown in FIG. 3. The width of the microchips is 0.75 inch leaving a 1/8 inch margin of exposed release strip on either side thereof, and the longitudinal length of each microchip is 1.19", leaving a 1/8" margin on either side of the ends of each microchip between such ends and the two transverse perforated lines between such microchip and its adjacent microchips. However, the size of the microchips may vary over a wide range, depending on the magnitude of the reduction in size of the originals desired and on the size of the originals, the aforesaid dimensions being given by way of example only.

The resulting strip of microchips is then rolled into the microchip so that the electrophotographic layer therefed one microchip at a time to the pick-up station on the metal microchip drum, as aforesaid, by the microchip feed roll, where each microchip is individually clamped to the drum surface, which is electrically grounded, the frame of the clamping face 3 engaging the exposed release strip around each microchip to thereby frame the microchip so that the electrophotographic layer thereof is exposed for charging, exposure and developing. Upon commencement of movement of the drum with the clamped microchip thereon while the feed roll is stationary, the weakened perforation line 8 in the release sheet strip adjacent the clamped microchip breaks to permit the microchip to move with the drum past the charging, exposure, developing and ejector stations to individually charge, expose, develop and eject the microchip while supported on the severed portion of the release strip.

In this way, individual microelectrophotographic copies (microelectrophotographs) of 8½ x 11 inch original documents are made on the individual microchips, one at a time, while supported on the severed portions of the release sheet in approximately six seconds each. Image development is achieved using Graphofax toner sold by Phillip A. Hunt Chemical Company. The ratio reduction is about 10 to 1.

Excellent reproduction is achieved with a resolution of approximately 100 lines per millimeter.

The developed microchips are peeled off the release sheet and pressed onto the storage sheet, as shown in FIG. 4.

Example 2

Same as Example 1, except that (1) the Kadox 72 is replaced with a mixture of equal mounts of photoconductive zinc oxide particles, sold under the names Photox 8 and Photox 80 (ultimate particle size of 0.3–0.4 micron) by the New Jersey Zinc Co., (2) the electrophotographic composition is coated onto a high grade Electrofax conductive base paper sold by Weyerhauser Paper Company under the designation Dencon S and presenting a surface which has a Sheffield Smoothness of 10–25 and to which the electrophotographic coating composition is applied, and (3) the pressure sensitive adhesive solution has conductive zinc oxide particles added thereto to make the pressure sensitive adhesive layer conductive and is as follows:

| | G. |
|---|---|
| Poly crepe | 100 |
| Coumaron indene resin | 60 |
| Toluene | 310 |
| Antioxidant | 3 |
| Conductive zinc oxide particles (sold under the name Zinc Oxide #2698 by New Jersey Zinc Co.) | [1] 100 |

[1] Volume ratio of poly crepe-coumaron indene resin to zinc oxide of about 3.5/1.

Although the quality of reproduction, the adhesiveness of the pressure sensitive adhesive, the release characteristics of the release sheet and the resolution are not as good as Example 1, they are satisfactory.

Example 3

Same as Example 2, except the release strip is a glassine sheet impregnated with conductive Dow QX 2611.12 resin (polyvinyl quarternary ammonium salt) in an amount equal to 2 pounds per 24 x 36 500 sheet ream and coated with a thin layer of silicone resin. Reproduction is improved over Example 2 but is still not as good as Example 1. Adhesive and release properties are about the same as Example 2.

Example 4

Same as Example 2 except the conductive zinc oxide is replaced by 18 grams of Dow QX 2611.12. Reproduction quality is about the same as Example 2 but the pressure sensitive adhesive properties and release properties are not as good.

The conductive zinc oxide particles in the pressure sensitive adhesives of Examples 2 and 3 can be replaced by other finely divided electrically conductive metals such as silver or gold or copper or aluminum flakes or granules or powders or finely divided carbon powders, e.g. graphite.

In Examples 2 and 3, the volume ratio of pressure sensitive adhesive to conductive particles in the dried pressure sensitive adhesive layer may range from about 11/1 to 1/1, more preferably from 8/1 to 2/1. The particle size of the conductive particles should be substantially smaller than the thickness of the pressure sensitive adhesive layer, which is usually in the nature of about a mil thick and may range from a fraction of a micron to 15 or 20 microns, preferably 0.5 micron to 2 or 3 microns.

In Example 4, the amount of conductive resin in the dried pressure sensitive adhesive layer may range from 1 to 20%, more preferably from 5 to 15%, by weight of the pressure sensitive adhesive.

Where inorganic salts are added to the pressure sensitive adhesive layer to make it conductive they may be used in a volume ratio of inorganic salt to pressure sensitive adhesive of between 1/10 and 1/1.

The minimum amount of electrically conductive medium added to the pressure sensitive adhesive (when such an adhesive is used and no unipotential surface is provided) is that which gives it sufficient through (through the thickness) conductivity to permit sufficient leakage of charge through the thickness thereof during the exposure time desired to produce the latent electrophotographic image. The maximum amount is that beyond which the cohesiveness and pressure sensitive adhesiveness of the adhesive is unduly decreased since these electrically conductive materials do not themselves have pressure sensitive adhesiveness and, accordingly, when added to the pressure sensitive adhesive, they reduce the cohesiveness and adhesiveness thereof.

In Example 3, the amount of conductive resin with which the release paper is impregnated may range from 1 to 5 lbs. per 24 x 36 500 sheet ream.

Conventional protective release sheets or liners for pressure sensitive adhesive labels are either themselves made of a material which has low adhesion to the pressure sensitive adhesive, e.g. glassine, silicone, etc., or they are coated with such a material, e.g. a silicone coated paper or plastic, such as a vinyl sheet, so that they can be readily peeled off from the adhesive to expose it without removing the adhesive from the backing sheet of the label. Such release sheets can be used in the present invention as the supporting strip for the microchips. Although they are non-conductive they are so thin they do not present an absolute barrier to leakage of charge through the thickness thereof.

However, they do interfere with through flow of charge to some extent and, accordingly, when a conductive pressure sensitive adhesive layer is used without a unipotential layer, substantially better electrophotographic reproduction is achieved by incorporating in the release sheet the aforesaid electrically conductive materials to increase the conductive rate of flow of charge therethrough, as in Example 3, a preferred amount being that which will provide a rate of flow of charge through the thickness thereof commensurate to the rate of flow through the thickness of the pressure sensitive adhesive layer. For example, where a silicone coated release paper is used the paper may be impregnated with the inorganic salt or conductive resin or conductive particles. Even better results are achieved, if, in addition, such resin or salt is added to the silicone coating. However, in such case, the amount added should not be so great as to unduly interfere with the release properties of the silicone.

In this way, when a unipotential surface is not used, the entire thickness of the substrate for the electrophotographic layer from the inner electrophotographic surface to the outer release paper surface is conductive.

In Example 1 any highly conductive thin flexible metal foil forming a continuous metal (unipotential) surface can be used, such as silver, gold, copper, etc. and it can be laminated with flexible resin coatings, such as polyvinyl resin coating, rather than paper.

Preferably, the continuous metal layer is quite thin, e.g. between 0.1 and 0.8 mil thick, whereas the paper or resin sheet thickness may vary from 0.5 to 4 or 6 mils or more in thickness.

Also the metal layer can be replaced with a thin layer of conductive carbon.

Where a unipotential layer is used, electrophotographic reproduction is not at all impaired by the use of conventional non-conductive release sheets and conventional pressure-sensitive adhesives.

The pressure sensitive adhesive layer in the aforesaid examples may be replaced by other kinds of adhesives, e.g. heat activatable, solvent activatable, etc., so long as either a unipotential surface is provided or the adhesive is made conductive.

The thickness of the pressure sensitive adhesive layer is the same as that in conventional pressure sensitive labels, e.g. between 0.8 and 1.2 mils.

The thickness of the electrophotographic layer is conventional and may range from 0.3–1.0 mil.

It has been found that resolution is reduced if the surface of the conductive base sheet to which the electrophotographic layer is applied has a Sheffield Smoothness greater than 40, a Sheffield Smoothness of from 15 to 30 being preferred.

Although, for optimum resolution, it is preferred that as little as possible of the photoconductive zinc oxide agglomerates have a particle size greater than 5–10 microns, so long as no more than about 2–5%, preferably no more than 1%, by volume have a particle size greater than 10 microns, excellent resolutions can be obtained. The best results are achieved when none of the zinc oxide has an agglomerate particle size greater than 5 microns. This is achieved by subjecting the electrophotographic composition to milling or other forms of attrition. Of course, where the reduction in size of the original to be achieved is relatively small, e.g. 3 to 1, then the volume of zinc oxide having an agglomerate particle size greater than 10 microns can be substantially greater than 5%, e.g. it may be 10% or more.

Preferred photoconductive zinc oxides for optimum resolution are those having an ultimate (as distinguished from agglomerate) particle size as small as possible, i.e., 0.1 micron, but good results can be achieved with photoconductive zinc oxide of conventional ultimate particle size, e.g. 0.3–0.5 micron.

Although it is preferred to use a supporting release strip to support the microchips, such a strip is not essential. In such case, the electrophotographic layer—aluminum foil laminated paper laminate of Example 1, without the pressure sensitive adhesive layer and supporting release sheet, or the conductive base paper—electrophotographic layer laminate of Example 2, without the pressure sensitive layer and supporting release sheet, may be cut into the 1" strips and perforated with transverse perforation lines or other lines of weakness 1" apart to form the microchips and to permit each microchip to be severed from the strip at the pick-up station and with feed holes being provided along the margins for feeding the strip in conventional manner. In these embodiments, both the pressure sensitive adhesive layer and the supporting release sheet of the aforesaid examples are eliminated.

In these embodiments the developed microchips may be removably mounted on the storage sheet by a dry pressure sensitive adhesive layer on the storage sheet or in any other conventional manner, e.g. in windows in the storage sheet. In fact, the microchips may be permanently mounted on the storage sheet or may be stored in some way other than mounting on a storage sheet.

Furthermore, where a supporting release strip is used, the exposed release strip margins along the sides of the microchips may be provided with feed holes or perforations for feeding the strip by conventional feed mechanisms utilizing such holes.

Also, instead of using transverse perforations and a pulling force to sever each microchip from the strip of microchips, with or without a supporting strip, a cutting knife can be used to cut the microchips from the strip.

Furthermore, if desired, the individual microchips need not be severed from the strip, i.e. the strip may move continuously with the drum so that a plurality of microchips, while still in the form of a continuous strip, are located on the moving drum surface with each microchip being charged, exposed and developed consecutively while still in the form of a continuous strip and with the ejector ejecting the microchip while still in strip form or with a knife at the ejector station to sever the microchips from the strip. This can be done with or without a supporting strip, i.e. with the microchips, themselves, forming the strip, as aforesaid. Where the microchips are ejected from the drum in strip form, there will be obtained a strip of microelectrophotographs. However, many of the advantages of the invention are not achieved by this technique.

As aforesaid, the surface speed of the drum is synchronized with the speed at which the original is moved past the scanning slit through reduction gearing to take into account the difference in size between the original and the microchips.

Although the means for moving the microchips past the charging, exposure and developing stations is in the form of a drum in the drawings, it may be in other form, e.g. a grounded conveying belt.

Also, although in the drawings, the drum and feed devices are driven by a motor, they may be driven by hand.

Furthermore, during exposure, the original and the microchip may both be held stationary using a conventional camera exposure opening and shutter to expose the whole microchip to the whole original and thereby produce the latent image as in conventional cameras.

Other conventional electrophotographic coating compositions can be used. Thus, the zinc oxide can be replaced by other photoconductive materials such as zinc cadmium sulfide, zinc sulfide, cadmium sulfide, titanium dioxide of very fine particle size, zinc cadmium selenide, selenium telluride, mercuric sulfide, selenium sulfide, stilbene, polyvinyl carbozole, imidizole derivatives and anthracene; the insulator resin can be replaced by other electrophotographic insulator resinous binders such as the alkyd resins, silicone resin, vinyl resins, e.g. polyvinylacetate and polyvinyl chloride homopolymers and copolymers, polyurethane, styrene, acrylonitrile, butadiene-styrene, etc. although acrylic resins are preferred; the sensitizer can be replaced by any conventional and compatible sensitizer; and the weight ratio of photoconductive particles to resin binder may range between 1/1 and 10/1 or higher.

Also, the electrophotographic layer can be applied to the substrate, be it metal or paper or plastic, in any conventional manner but preferably as a dispersion of the photoconductive particles in a solution of the resin in a solvent.

As aforesaid, the pressure sensitive adhesive of the examples can be replaced with other conventional pressure sensitive adhesives, such as acrylic-polyvinyl acetate copolymers laid down from an ethyl acetate-toluene solvent, polyvinyl ether, polyvinyl alcohol, plasticized polyisobutylene, plasticized rubber, plasticized poly esters, plasticized butadiene-styrene, etc. These resins may be plasticized with conventional plasticizers, such as the oleates, oil, phthalates, e.g. dioctyl phthalate, tricresyl phosphate, poly-alpha methyl styrene, etc. to achieve the tackiness and strength required.

Preferred pressure sensitive adhesives are those comprising a mixture of a highly tacky resin, i.e. tackifying agent, such as a hydrogenerated wood rosin or coumaron indene resin, and a less tacky back-bone resin such as styrene-butadiene, rubber or poly crepe for strength and control of tackiness.

The reduction in tack of the pressure sensitive adhesive caused by the addition of conductive particles or conductive resins, which are tack reducers, can be compensated for by increasing the ratio of tackifying agent to the less tacky back-bone resin or by the use of a more tacky tackifying agent.

Where a liquid toner is to be used for development it is especially preferred to use in the pressure sensitive adhesive layer and as a binder in the electrophotographic layer a polyacrylic resin, e.g. a poly acrylic-vinyl acetate copolymer, which is resistant to the liquid carrier of the toner, e.g., odorless mineral spirits, used in the developing step.

In essence, the apparatus shown in the drawings corresponds to a reduction camera similar in principle to microfilm cameras except that individual microelectrophotographic sheets are used for each original instead of a length of microfilm for thousands of originals, and the unit incorporates charging and developing stations in addition to an exposure station, and individual, one-at-a-time, instantly developed, direct, positive microimages of single documents are obtained to provide instant filing and retrieval of information in a single document.

A search of the prior art revealed the following patents, none of which discloses a method and apparatus for microelectrophotography in accordance with the invention: 3,401,037, 3,245,785, 3,127,333, 2,979,402, 3,298,-831, 3,446,616, 3,010,884, Re. 25,444, 3,107,169, 3,241,-958, 3,411,903, 3,436,215, 3,152,894, 3,438,773, 3,077,-398, 3,468,660, 3,206,307, 3,197,307, 3,428,453, 3,132,-204, 2,636,297, 2,596,179, 2,808,352.

The invention has been described in detail with respect to preferred embodiments thereof, but it will be understood that variations and modifications can be effected within the spirit and scope of the invention as defined in the appended claims.

We claim:

1. A microphotographic microelectrophotographic chips removably mounted on a storage sheet by a pressure sensitive adhesive for microelectrophotographing an original to produce a plurality of microphotographs, each microphotograph comprising an electrophotographic layer adhered to an electrically conductive base sheet, said layer comprising agglomerates of photo conductive particles embedded in an insulator binder, the surface of said base sheet to which said layer is applied having a maximum Sheffield Smoothness of 40.

2. A sheet according to claim 1 wherein no more than 5% by volume of the agglomerates is greater than 10 microns in size.

3. A sheet according to claim 2 wherein the photoconductive particles are zinc oxide particles.

4. A microelectrophotographic sheet according to claim 2 wherein the base sheet comprises a unipotential surface to which the electrophotographic layer is applied.

5. A microelectrographic sheet according to claim 2 wherein the base sheet comprises a flexible continuous layer of electrically conductive metal to which the electrophotographic layer is applied.

6. A microelectrophotographic sheet according to claim 5 wherein the metal layer is laminated to a flexible sheet selected from the group consisting of paper and plastic.

7. A plurality of microelectrophotographic sheets according to claim 5 wherein said sheets are removably mounted in a row on a supporting strip which comprises the supporting sheet for the plurality of said sheets.

8. A plurality of microelectrophotographic sheets according to claim 7 wherein the addition of the pressure sensitive adhesive to said sheets and the cohesiveness of said pressure sensitive adhesive is substantially greater than its adhesion to the supporting strip, thereby allowing said sheets and the pressure sensitive adhesive layer to be peeled off said supporting strip and removably secured to a securing surface.

9. A microelectrophotographic sheet according to claim 2 wherein said sheet is removably adhered to the supporting sheet by an electrically conductive pressure sensitive layer.

10. A plurality of individual microelectrophotographic sheets according to claim 9 wherein said sheets are removably mounted in a row on an elongated supporting strip which comprises the support for the plurality of said microelectrophotographic sheets.

11. A plurality of microelectrophotographic sheets according to claim 10 wherein the adhesion of the pressure sensitive adhesive of the conductive pressure sensitive layer to said microelectrophotographic sheets and its cohesion is greater than its adhesion to the supporting strip.

12. A plurality of microelectrophotographic sheets according to claim 11 wherein said sheets are mounted on a supporting strip which has a line of weakness between adjacent microelectrophotographic sheets.

References Cited

UNITED STATES PATENTS

| 3,418,119 | 12/1968 | Schwartz et al. | 96—27 |
| 3,198,632 | 8/1965 | Kimble et al. | 96—1 |

FOREIGN PATENTS

| 28,037 | 12/1965 | Japan | 96—1.5 |

GEORGE F. LESMES, Primary Examiner

M. B. WITTENBERG, Assistant Examiner

117—201, 715, 718

UNITED STATES PATENT OFFICE
CERTIFICATE OF CORRECTION

Patent No. 3,695,874            Dated October 3, 1972

Inventor(s) Lee Allen Carlson, et. al.

It is certified that error appears in the above-identified patent and that said Letters Patent are hereby corrected as shown below:

Column 12, line 49, after "microphotographic" insert -- sheet comprising a plurality of -- ; line 50, change "storage" to -- supporting -- ; line 51, change "an original" to -- originals -- ; line 52, change "micro-" to -- chip -- ; line 53, cancel "photograph"; lines 74 and 75, change "sheets" to -- chips -- . Column 13, lines 2, 3, 5 and 8, change "sheets" to -- chips -- ; line 4, change "addition" to -- adhesion -- ; line 6, change "is" to -- are -- ; line 12, change "sheet is" to -- chips are -- ; line 16, change "sheets", both occurrences, to -- chips -- ; lines 19 and 20, change "sheets" to -- chips -- . Column 14, line 1, change "sheets" to -- chips -- ; line 2, change "is" to -- are -- ; lines 4 and 5, change "sheets" to -- chips -- .

Signed and sealed this 20th day of March 1973.

(SEAL)
Attest:

EDWARD M. FLETCHER, JR.
Attesting Officer

ROBERT GOTTSCHALK
Commissioner of Patents